United States Patent Office 3,674,495
Patented July 4, 1972

3,674,495
SENSITIZING LAYER

Teruo Esaka, Tokyo, Japan, assignor to Okamoto Chemical Industry Company Limited, Saitama Prefecture, Japan No Drawing. Filed Sept. 5, 1969, Ser. No. 855,773
Claims priority, application Japan, May 30, 1969, 44/42,322
Int. Cl. G03c 5/18, 7/30
U.S. Cl. 96—91 R 10 Claims

ABSTRACT OF THE DISCLOSURE

A sensitizing layer containing an ester of a compound of the general formula $$HO-R-N=N-R'-N\begin{array}{l}\diagup X\\ \diagdown Y\end{array}$$

(wherein R represents a benzene or naphthalene nucleus with a radical selected from the group consisting of hydroxyl, halogen, nitro, alkyl and alkoxy; R' represents a benzene nucleus which may contain a radical selected from the group consisting of hydroxyl (—OH), halogen (—Cl, F, Br, I), nitro (—$NO_2$), alkyl (—$C_nH_{2n+1}$) and alkoxy (—$OC_nH_{2n+1}$); and X and Y individually represent a radical of alkyl, alkylalcohol (—$C_nH_{2n}\cdot OH$) or alkoxy) with a diazonaphtholsulfonic acid.

BACKGROUND OF THE INVENTION

This invention relates to an improvement in the photo sensitizing layer.

DESCRIPTION OF THE PRIOR ART

Hitherto, there have been known printing plates in which the sensitizing layer contains a diazoxysulfonate ester or diazoxysulfonamide, the diazoxysulfonic acid derivative is converted on exposure into an alkali-soluble form and the exposed areas are dissolved away on treatment with a weak aqueous alkali. Thereby, a positive image is obtainable from a positive film, as disclosed in detail in U.S. Pats. Nos. 3,046,110, 3,046,113, 3,046,116, 3,046,117, 3,046,118, 3,046,121, 3,046,123, 3,046,124 and 3,050,389. The sensitizing layers containing a diazoxysulfonate ester or diazoxysulfonamide compound, exhibit no change in chroma and/or hue after exposure with respect to the color of printing plate (e.g. light yellow) and, consequently, no distinct difference between exposed and unexposed areas. It has already been known for facilitating the confirmation of an image after development to incorporate in the sensitizing layer an organic coloring matter which will change its color depending on the pH. In this case, however, the coloring matter remains as an impurity in the image area and since it is insensitive to light it deteriorates the quality of the picture.

SUMMARY OF THE INVENTION

In the sensitizing layer of the present invention no ordinary coloring matter is incorporated, and, although it is colored by reaction between a diazoxysulfochloride and an azo dye, it differs from the colored sensitizing layers of the prior art, for example disclosed in U.S.A. Pat. No. 3,046,115, in that it exhibits change in hue upon exposure. The sensitizing layer of the present invention consists of a photosensitive compound which will change its hue to a great extent upon exposure, the photosensitive compound by itself exhibiting a remarkable change in hue as a result of change in its molecular structure to afford an image having an excellent contrast.

The objects of the present invention are:

(1) To provide a sensitizing layer which contains a novel photosensitive compound that will, by itself change its hue upon exposure, and (2) To provide a sensitizing layer containing a compound obtained by esterification of a compound represented by the general formula $$HO-R-N=N-R'-N\begin{array}{l}\diagup X\\ \diagdown Y\end{array}$$

(wherein R represents a benzene or naphthalene nucleus which may contain a hydroxyl, halogen, nitro, alkyl or alkoxy groups; R' represents a benzene nucleus which may contain a hydroxyl, halogen, nitro, alkyl or alkoxy group; and X and Y individually represent an alkyl, alkylalcohol or alkoxy group) with a diazonaphtholsulfonic acid.

DESCRIPTION OF THE PREFERRED EMBODIMENTS

A series of compounds prepared by esterification of the compounds represented by the above general formula $$HO-R-N=N-R'-N\begin{array}{l}\diagup X\\ \diagdown Y\end{array}$$

with a diazonaphtholsulfonic acid is represented by the general formula

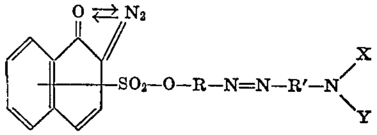

(where, in the formula, R, R', X and Y have the same meanings as designated above, $N_2$ and O on the naphthalene nucleus may change positions with each other).

The sensitizing layer containing such a compound exhibits a remarkable change in hue upon exposure which will facilitate the discrimination between the exposed area and unexposed area. Accordingly, in the case of multipartite exposure it is advantageous to discriminate the image in the previously exposed area, and arrangement of registered marks, double exposure and like procedures are also facilitated. It is believed that by exposure the diazoxide is converted into a five-membered cyclic carboxylic acid which is more soluble tn an aqueous alkali. Thus, the exposed area is quickly dissolved away while the unexposed area is not affected by the aqueous alkali, so that there is obtained a picture having an excellent contrast.

The diazonaphtholsulfonic acid preferably is used in the form of diazoxysulfochloride for ease of esterification.

The compound represented by the general formula $$HO-R-N=N-R'-N\begin{array}{l}\diagup X\\ \diagdown Y\end{array}$$

which is used for esterification with a diazoxysulfochloride includes, e.g.,

4'-hydroxy-4-dimethylaminoazobenzene,
4'-hydroxy-4-diethylaminoazobenzene,
4'-hydroxy-4-N-ethyl-N-hydroxyethylaminoazobenzene,
3'-hydroxy-4-dimethylaminoazobenzene,
4'-hydroxy-3'-methyl-4-diethylaminoazobenzene,
4'-hydroxy-3'-methyl-4-dimethylaminoazobenzene,
4'-hydroxy-3'-nitro-4-dimethylaminoazobenzene,
4'-hydroxy-3'-methyl-4-N-ethyl-N-hydroxyethylaminoazobenzene, 2'-hydroxy-3'-methyl-4-dimethylaminoazobenzene,
2'-hydroxy-3'-methoxy-4-diethylaminoazobenzene and the like, and chlorinated derivatives thereof, such as 4'-hydroxy-3'-chloro-4-dimethylaminoazobenzene.

The ester may be prepared by dissolving a diazoxy-sulfochloride, such as 2-diazo-1-naphthol-5-sulfochloride or 2-diazo-1-naphthol-4-sulfochloride, and a compound of the above general formula, such as 4'-hydroxy-4-dimethylaminoazobenzene, in a solvent, such as dioxane or acetone, and adding to the resulting solution a sodium carbonate, sodium bicarbonate or like weak alkali.

In the manufacture of printing plates, the photosensitive compound is dissolved in an alcohol or Cellosolve-type solvent and applied to a suitable support and dried to form a sensitizing layer.

For enhancing long-run ability and oleophilicity, it is desirable to use the sensitive compound in mixture with an alkali-soluble resin, such as phenol-formaldehyde or cresolformaldehyde resin. The alkali-soluble resin may be prepared by heating a phenol or cresol with a formalin or paraformaldehyde in the presence of the catalyzer including an acidic composition, such as hydrochloric acid or oxalic acid. The alkali-soluble resin and the photosensitive compound are mixed in the ratio of from 1:07 to 1:0.1. The mixture is dissolved in a solvent, such as methanol, ethanol, acetone, methyl Cellosolve, ethyl Cellosolve, butyl Cellosolve, 2-nitropropane or the like or mixtures thereof, and supplied to a suitable support. The application may conveniently be carried out by wheeler coating, dip coating or roller coating, and the viscosity of the coating solution is to be adjusted, so as to match the coating means adopted, by appropriate choice of the solvent, resin and photosensitive compound.

Examples of the support used are aluminum, zinc, copper, magnesium, stainless steel, iron or composite sheets formed of such metals, and plastics. After an ordinary pretreatment, the support is coated with a solution containing a photosensitive compound and a resin and dried. The sensitized material thus obtained is exposed for about 2 minutes through a positive film to a 30 a. arc lamp placed 70 cm. apart from the sensitized material. The development may be carried out by soaking the sensitizing surface in an aqueous alkali contained in a vat, or flowing an aqueous alkali over the sensitizing surface or tapping the sensitizing surface with an absorbent cotton or like absorbent material impregnated with an aqueous alkali. The aqueous alkali suitably used includes a 5 to 10% aqueous solution of, e.g., caustic soda, trisodium phosphate, disodium phosphate, sodium carbonate, sodium silicate, sodium orthosilicate, barium hydroxide, calcium nitrate, strontium hydroxide, beryllium oxide, bismuth hydroxide or the like or mixture thereof.

The present invention will now be illustrated by the following examples.

EXAMPLE 1

3 g. of a compound corresponding to the following formula

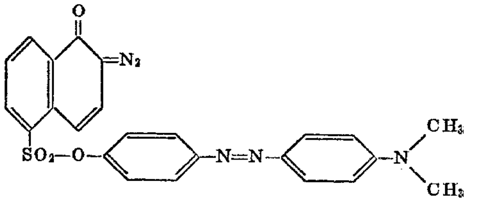

(Formula 1)

and 7 g. of a cresol-formaldehyde resin were dissolved in 100 cc. of ethyl Cellosolve and the resulting solution was applied to a grained aluminium plate. After drying, the plate was exposed for about 2 minutes through a positive film to a 30 a. arc lamp at an irradiation distance of 70 cm. Then, the exposed area changed from original yellow to red. Accordingly, the exposed area could be easily detected. After exposure, the plate was developed by soaking in a solution containing 5% of trisodium phosphate and 0.8% of caustic soda in a vat. Thus, the exposed area of the sensitizing film discolored to red by exposure was leached out and the unexposed area formed an image of a high contrast having an excellent oleophilicity.

The diazo compound corresponding to the (Formula 1) was prepared in the manner as follows: 24.1 g. of 4'-hydroxy-4-dimethylaminoazobenzene and 27 g. of 2-diazo-1-naphthol-5-sulfochloride were dissolved in 300 cc. of dioxane. To the solution there was then added dropwise, with stirring, a 10% aqueous sodium carbonate until the reaction mixture exhibited a weak alkalinity. Thereafter, the reaction mixture was stirred for about 30 minutes and then poured into a dilute aqueous hydrochloric acid to precipitate a solid compound corresponding in chemical structure to the above identified Formula 1. The precipitate was recovered by filtration, thoroughly washed with water and dried.

EXAMPLE 2

3 g. of a compound corresponding to the following formula

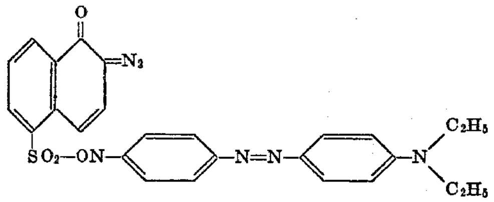

(Formula 2)

and 7 g. of a cresol-formaldehyde resin were dissolved in 100 cc. of ethyl Cellosolve and the resulting solution was applied to a grained aluminium plate. After drying, the plate was exposed for 2 minutes through a positive film to an arc lamp in the same manner as in Example 1. Then, the exposed area changed from original yellow to reddish orange. Accordingly, the exposed area could easily be discriminated. After exposure, the plate was developed with a solution of similar alkali strength as in Example 1. The exposed area of reddish orange alone was quickly leached out and the unexposed area remained as an image of high contrast having an excellent oleophilicity.

The compound corresponding to the Formula 2 was prepared as follows: 26.9 g. of 4'-hydroxy-4-diethylaminoazobenzene and 27 g. of 2-diazo-1-naphthol-5-sulfochloride were dissolved in 300 cc. of dioxane. To the solution there was added dropwise, with stirring, a 10% aqueous sodium carbonate until the liquid reaction mixture exhibited a weak alkalinity. Thereafter, the stirring was continued for about 30 minutes and the mixture was poured into a dilute aqueous hydrochloric acid to precipitate a compound corresponding to the Formula 2 chemical structure. The precipitate was recovered by filtration, washed thoroughly with water and dried.

EXAMPLE 3

2 g. of a compound corresponding to the following formula

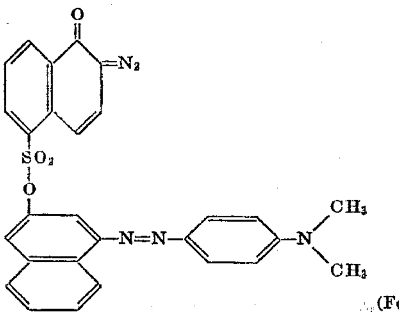

(Formula 3)

and 7 g. of a phenol-formaldehyde resin were dissolved in 100 cc. of ethyl Cellosolve and the resulting solution was applied to a grained aluminium plate. After drying, the plate was exposed for 2 minutes through a positive film to an arc lamp in the same manner as in Example 1. Then, the exposed area changed from original yellow to reddish orange. Accordingly, the exposed area was easily be discriminated. After exposure, the plate was developed in an aqueous alkali of the similar strength as in Example 1. The exposed reddish yellow area only was quickly leached out and the unexposed area formed an image of a high contrast having an excellent oleophilicity.

The compound corresponding to the Formula 3 was prepared as follows: 29.1 g. of a coupling product of β-naphthol and p-N,N-dimethylaminoazobenzene diazonium salt and 29 g. of 2-diazo-1-naphthol-5-sulfochloride were dissolved in 300 cc. of dioxane. With stirring the resulting solution there was added dropwise a 10% aqueous sodium carbonate until the liquid reaction mixture exhibited a weak alkalinity. The stirring was thereafter continued for about 30 minutes and the mixture was then poured into a dilute aqueous hydrochloric acid to precipitate a compound corresponding to the Formula 3. The precipitate was recovered by filtration, washed thoroughly with water and dried.

EXAMPLE 4

2 g. of a compound corresponding to the following formula

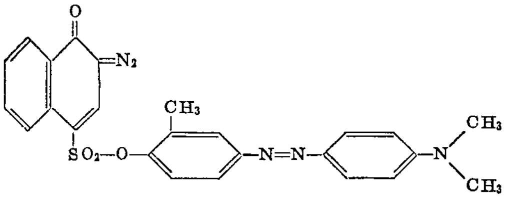

(Formula 4)

and 7 g. of a cresol-formaldehyde resin and 0.1 g. of an oil blue dye were dissolved in 100 cc. of ethyl Cellosolve. The resulting solution was applied to a grained aluminum plate and dried in the similar manner as in Example 1. The plate was then exposed for 2 minutes through a positive film to an arc lamp. Then, the exposed area changed from bluish green to purple. Accordingly, the exposed area was easily discriminated. After exposure, the plate was developed with an aqueous alkali of the same strength as in Example 1. The exposed purple area only was quickly leached out. In this example, a blue dye was incorporated in a small quantity in the sensitizing layer, and the dye afforded a distinct color change in cooperation with the color change of the photosensitive compound itself. The dye had no adverse effect on the quality of image because of its small quantity, and there was obtained an image of a high contrast having an excellent oleophilicity as in the case of the other examples.

The compound corresponding to the Formula 4 was prepared as follows: 26.9 g. of 4′-hydroxy-3′-methyl-4-dimethylaminoazobenzene and 27 g. of 2-diazo-1-naphthol-4-sulfochloride were dissolved in 300 cc. of dioxane. To the resulting solution there was added, with stirring, a 10% aqueous sodium carbonate dropwise until the liquid reaction mixture exhibited a weak alkalinity. Thereafter, the stirring was continued for about 30 minutes and the mixture was then poured into a dilute aqueous hydrochloric acid to precipitate a solid compound corresponding to the Formula 4. The precipitate was recovered by filtration, washed thoroughly with water and dried.

EXAMPLE 5

2. g. of a compound corresponding to the following formula

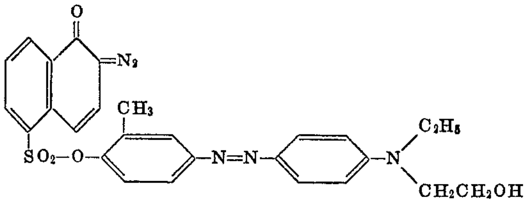

(Formula 5)

and 7 g. of a cresol-formaldehyde resin were dissolved in a mixture of 80 cc. of ethyl Cellosolve, 30 cc. of 2-nitropropane and 10 cc. of methanol. The resulting solution was applied to a grained aluminium plate, dried and exposed for about 2 minutes through a positive film to an arc lamp in the similar manner as in Example 1. Then the exposed area changed from initial yellow to red. Accordingly, the exposed area was very easily discriminated. After exposure, the plate was developed with an aqueous alkali of the similar strength as in Example 1. The exposed red area was quickly leached out leaving an image of a high contrast and an excellent oleophilicity as in the other examples.

The compound corresponding to the Formula 5 was prepared as follows: 29.9 g. of 4′-hydroxy-3′-methyl-4-N-ethyl-N-hydroxyethylaminoazobenzene and 27 g. of 2-diazo-1-naphthol-5-sulfochloride were dissolved in 300 cc. of dioxane. To the resulting solution, with stirring, there was added dropwise a 10% aqueous sodium carbonate until the liquid reaction mixture exhibited a weak alkalinity. Thereafter, the stirring was continued for about 30 minutes and the mixture was then poured into a dilute aqueous hydrochloric acid to precipitate a compound corresponding to the Formula 5. The precipitate was recovered by filtration, washed thoroughly with water and dried.

EXAMPLE 6

2. g. of a compound corresponding to the following formula

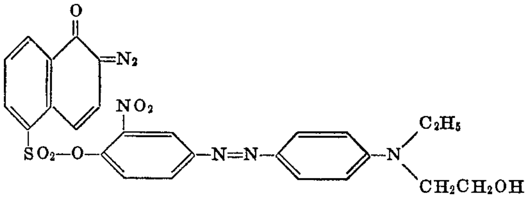

(Formula 6)

and 7 g. of a cresol-formaldehyde resin were dissolved in 100 cc. of ethyl Cellosolve, and the resulting solution was applied to a grained aluminium plate and dried. The plate was exposed for about 2 minutes through a positive film to an arc lamp in the similar manner as in Example 1. Then, the exposed area changed from yellow to reddish orange. Accordingly, the exposed area was very easily discriminated. After exposure, the plate was developed with an aqueous alkali of the similar strength as in Example 1. The exposed reddish orange area was quickly leached out leaving an image of a high contrast and an excellent oleophilicity as in the other examples.

The diazo compound corresponding to the Formula 6 was prepared by dissolving 33 g. of 4′-hydroxy-3′-nitro-4-N-ethyl-N-hydroxyethylaminoazobenzene and 27 g. of 2-diazo-1-naphthol-5-sulfochloride in 300 cc. of dioxane. To the resulting solution was added dropwise a 10% aqueous sodium carbonate, with stirring, until the liquid reaction mixture exhibited a weak alkalinity. Thereafter the stirring was continued for about 30 minutes and the mixture was then poured into a dilute aqueous hydrochloric acid to precipitate a compound corresponding to the Formula 6. The solid precipitate was recovered by filtration, washed thoroughly with water and dried.

I claim:

1. A sensitizing layer containing a compound represented by the following general formula

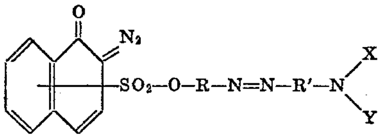

(where, in the formula, R represents a benzene or naphthalene nucleus which may contain a radical selected from the group consisting of hydroxyl, halogen, nitro, alkyl and alkoxy; R' represents a benzene nucleus which may contain a radical selected from the group consisting of hydroxyl, halogen, nitro, alkyl and alkoxy; and X and Y represent individually an alkyl, alkylalcohol or alkoxy radical, $N_2$ and O on the naphthalene nucleus may change positions with each other).

2. A sensitizing layer as defined in claim 1 which contains an alkali-soluble resin selected from the group consisting of phenol-formaldehyde resin and cresol-formaldehyde resin.

3. A sensitizing layer containing a photosensitive compound formed by esterification between a compound represented by the general formula $$HO-R-N=N-R'-N\begin{matrix}X\\Y\end{matrix}$$

(where, in the above formula, R represents a benzene or naphthalene nucleus which may contain a radical selected from the group consisting of hydroxyl, halogen, nitro, alkyl and alkoxy; R' represents a benzene nucleus which may contain a radical selected from the group consisting of hydroxyl, halogen, nitro, alkyl and alkoxy; and X and Y represent individually an alkyl, alkylalcohol or alkoxy radical) and a compound represented by the general formula

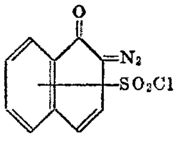

(where, in the above formula, $N_2$ and O on the naphthalene nucleus may change positions with each other.

4. A sensitizing layer as defined in claim 3 in which the compound represented by the general formula $$HO-R-N=N-R'-N\begin{matrix}X\\Y\end{matrix}$$

is a compound selected from the group consisting of:

4'-hydroxy-4-dimethylaminoazobenzene,
4'-hydroxy-4-diethylaminoazobenzene,
4'-hydroxy-4-N-ethyl-N-hydroxyethylaminoazobenzene,
3'-hydroxy-4-dimethylaminoazobenzene,
4'-hydroxy-3'-methyl-4-diethylaminoazobenzene,
4'-hydroxy-3'-methyl-4-dimethylaminoazobenzene,
4'-hydroxy-3'-nitro-4-dimethylaminoazobenzene,
4'-hydroxy-3'-methyl-4-N-ethyl-N-hydroxyethylaminoazobenzene,
2'-hydroxy-3'-methyl-4-dimethylaminoazobenzene,
2'-hydroxy-3'-methoxy-4-diethylaminoazobenzene and
4'-hydroxy-3'-chloro-4-dimethylaminoazobenzene.

5. A sensitizing layer as defined in claim 3 in which the compound represented by the general formula.

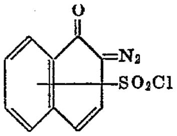

is a compound selected from the group consisting of 2-diazo-1-naphthol-5-sulfochloride,
2-diazo-1-naphthol-4-sulfochloride,
1-diazo-2-naphthol-5-sulfochloride and
1-diazo-2-naphthol-4-sulfochloride.

6. A sensitizing layer as defined in claim 3 in which the compound represented by the general formula $$HO-R-N=N-R'-N\begin{matrix}X\\Y\end{matrix}$$

is a compound selected from the group consisting of:

2'-hydroxynaphthalene-4-azo-N,N-dimethylaniline,
2'-hydroxynaphthalene-4-azo-N-ethyl-N-hydroxyethylaniline,
2'-hydroxynaphthalene-4-azo-N,N-diethylaniline,
4'-hydroxynaphthalene-4-azo-N,N-dimethylaniline,
4'-hydroxynaphthalene-4-azo-N,N-diethylaniline,
4'-hydroxynaphthalene-4-azo-N-ethyl-N-hydroxyethylaniline and
4'-hydroxy-3'-nitronaphthalene-4-azo-N,N-dimethylaniline.

7. A process for the manufacture of a photosensitive esterified compound represented by the general formula $$HO-R-N=N-R'-N\begin{matrix}X\\Y\end{matrix}$$

(wherein R represents a benzene or naphthalene nucleus which may contain a hydroxyl, halogen, nitro, alkyl or alkoxy groups; R' represents a benzene nucleus which may contain a hydroxyl, halogen, nitro, alkyl or alkoxy group; and X and Y individually represent an alkyl, alkylalcohol or alkoxy group) with a diazonaphtholsulfonic acid, comprising:

the step of esterification of said compound with a diazonaphtholsulfonic acid represented by the general formula

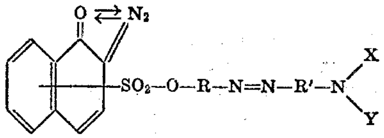

(where, in the formula, R, R', X and Y have the same meanings as designated above and $N_2$ and O on the naphthalene nucleus may change positions with each other).

8. A process for the manufacture of a photosensitive esterified compound as claimed in claim 7, said diazoxysulfochloride being selected from a group consisting of 2-diazo-1 - naphthol-5-sulfochloride and 2-diazo-1-naphthol-4-sulfochloride, and further comprising:

the steps of dissolving said diazoxysulfochloride together with said compound of the above general formula, in a solvent and adding to the resulting solution a weak alkali.

9. A process for the manufacture of a photosensitive esterified compound as claimed in claim 7, said diazonaphtholsulfonic acid being diazoxysulfochloride and the compound represented by the general formula $$HO-R-N=N-R'-N\begin{matrix}X\\Y\end{matrix}$$

is a compound selected from the group consisting of

4'-hydroxy-4-dimethylaminoazobenzene,

4'-hydroxy-4-diethylaminoazobenzene,
4'-hydroxy-4-N-ethyl-N-hydroxyethylaminoazobenzene,
3'-hydroxy-4-dimethylaminoazobenzene,
4'-hydroxy-3'-methyl-4-diethylaminoazobenzene,
4'-hydroxy-3'-methyl-4-dimethylaminoazobenzene,
4'-hydroxy-3'-nitro-4-dimethylaminoazobenzene,
4'-hydroxy-3'-methyl-4-N-ethyl-N-hydroxyethylamino-azobenzene,
2'-hydroxy-3'-methyl-4-dimethylaminoazobenzene,
2'-hydroxy-3'-methoxy-4-diethylaminoazobenzene and the like.

10. A process for the manufacture of a photosensitive esterified compound as claimed in claim 7, further comprising the step of mixing said compound with an alkali soluble resin, selected from the group consisting of:

phenol-formaldehyde and cresolformaldehyde resin, prepared by heating a phenol or cresol respectively with a formalin of paraformaldehyde in the presence of a catalyzer, the said alkali-soluble resin and the said photosensitive compound being mixed in the ratio of from 1:0.7 to 1:0.1, dissolved in a solvent into a mixture.

References Cited

UNITED STATES PATENTS

| | | | |
|---|---|---|---|
| 3,532,055 | 10/1970 | Wheeler | 96—33 X |
| 3,554,751 | 1/1971 | Thomas | 96—33 |
| 3,046,117 | 7/1962 | Süs | 96—33 |
| 3,046,120 | 7/1962 | Schmidt et al. | 96—33 |
| 3,046,122 | 7/1962 | Süs | 96—33 |
| 3,046,123 | 7/1962 | Süs et al. | 96—33 |
| 3,046,124 | 7/1962 | Schmidt | 96—33 |
| 3,046,131 | 7/1962 | Schmidt et al. | 96—33 X |

HAROLD ANSHER, Primary Examiner

U.S. Cl. X.R.

96—33